US012669926B2

(12) United States Patent
Wu et al.

(10) Patent No.: US 12,669,926 B2
(45) Date of Patent: Jun. 30, 2026

(54) IMAGE PROCESSING METHOD AND APPARATUS, AND DEVICE

(71) Applicant: Beijing Zitiao Network Technology Co., Ltd., Beijing (CN)

(72) Inventors: Xinchen Wu, Beijing (CN); Ye Lin, Beijing (CN); Di Wu, Beijing (CN); Yingke Wang, Beijing (CN); Chenxuan Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 168 days.

(21) Appl. No.: 18/571,194

(22) PCT Filed: Aug. 3, 2022

(86) PCT No.: PCT/CN2022/110090
§ 371 (c)(1),
(2) Date: Dec. 15, 2023

(87) PCT Pub. No.: WO2023/011557
PCT Pub. Date: Feb. 9, 2023

(65) Prior Publication Data
US 2024/0289005 A1      Aug. 29, 2024

(30) Foreign Application Priority Data
Aug. 6, 2021    (CN) ......................... 202110902826.7

(51) Int. Cl.
G06F 3/04845      (2022.01)
G06T 11/00        (2026.01)
G06T 13/80        (2011.01)

(52) U.S. Cl.
CPC .......... G06F 3/04845 (2013.01); G06T 11/00 (2013.01); G06T 13/80 (2013.01); *G06T 2200/24* (2013.01)

(58) Field of Classification Search
CPC .... G06F 3/04845; G06F 3/0484; G06T 11/00; G06T 13/80; G06T 2200/24; G06T 3/40
See application file for complete search history.

(56) References Cited

U.S. PATENT DOCUMENTS 9,185,284 B2 * 11/2015 Chao ..................... G06T 3/4038
2010/0223568 A1    9/2010 Quek et al.
(Continued)

FOREIGN PATENT DOCUMENTS

CN        104702406 A      6/2015
CN        305227517 S   *  6/2019
(Continued)

OTHER PUBLICATIONS

Written Opinion for International Application No. PCT/CN2022/110090, mailed Oct. 17, 2022, 10 Pages.
(Continued)

*Primary Examiner* — Michael Le
(74) *Attorney, Agent, or Firm* — BakerHostetler

(57)        ABSTRACT

Embodiments of the present disclosure provide an image processing method and apparatus, and a device. The method includes: displaying a number M of first images in a first region, each first image corresponding to a number N of sub-images, the number N of sub-images being images formed by dividing the first image into N parts, M being an integer greater than or equal to 1, and N being an integer greater than 1; in response to a first operation instruction, determining a number K of sub-images from the number of M*N sub-images corresponding to the number M of first images, and displaying some or all of the K sub-images in a second region, K being an integer greater than or equal to 1; and updating a display mode of the number M of first images according to the K sub-images, and displaying a splicing number corresponding to each first image, the
(Continued)

splicing number being a number of first images formed by splicing the K sub-images.

18 Claims, 11 Drawing Sheets

(56)                    References Cited

U.S. PATENT DOCUMENTS

| | | | | |
|---|---|---|---|---|
| 2011/0064383 A1* | 3/2011 | Bauchot | ................. | G06Q 30/02 |
| | | | | 386/E5.028 |
| 2014/0292760 A1* | 10/2014 | Shikolay | ................... | G06T 3/40 |
| | | | | 345/428 |
| 2015/0325019 A1* | 11/2015 | Sukeno | ............ | H04N 21/44016 |
| | | | | 345/634 |
| 2017/0178372 A1* | 6/2017 | Gormish | ................. | G06T 11/60 |
| 2018/0018931 A1* | 1/2018 | Zhang | ................... | G09G 5/397 |
| 2021/0158481 A1* | 5/2021 | Wang | ........................ | G06T 7/11 |

FOREIGN PATENT DOCUMENTS

| | | | | |
|---|---|---|---|---|
| CN | 112068920 A | * | 12/2020 | ........... G06F 16/957 |
| CN | 112884463 A | | 6/2021 | |

OTHER PUBLICATIONS

International Patent Application No. PCT/CN2022/110090; Int'l Search Report; dated Oct. 17, 2022; 2 pages.

* cited by examiner

First image

Divide it into
two parts

Six
sub-images

Sub-image

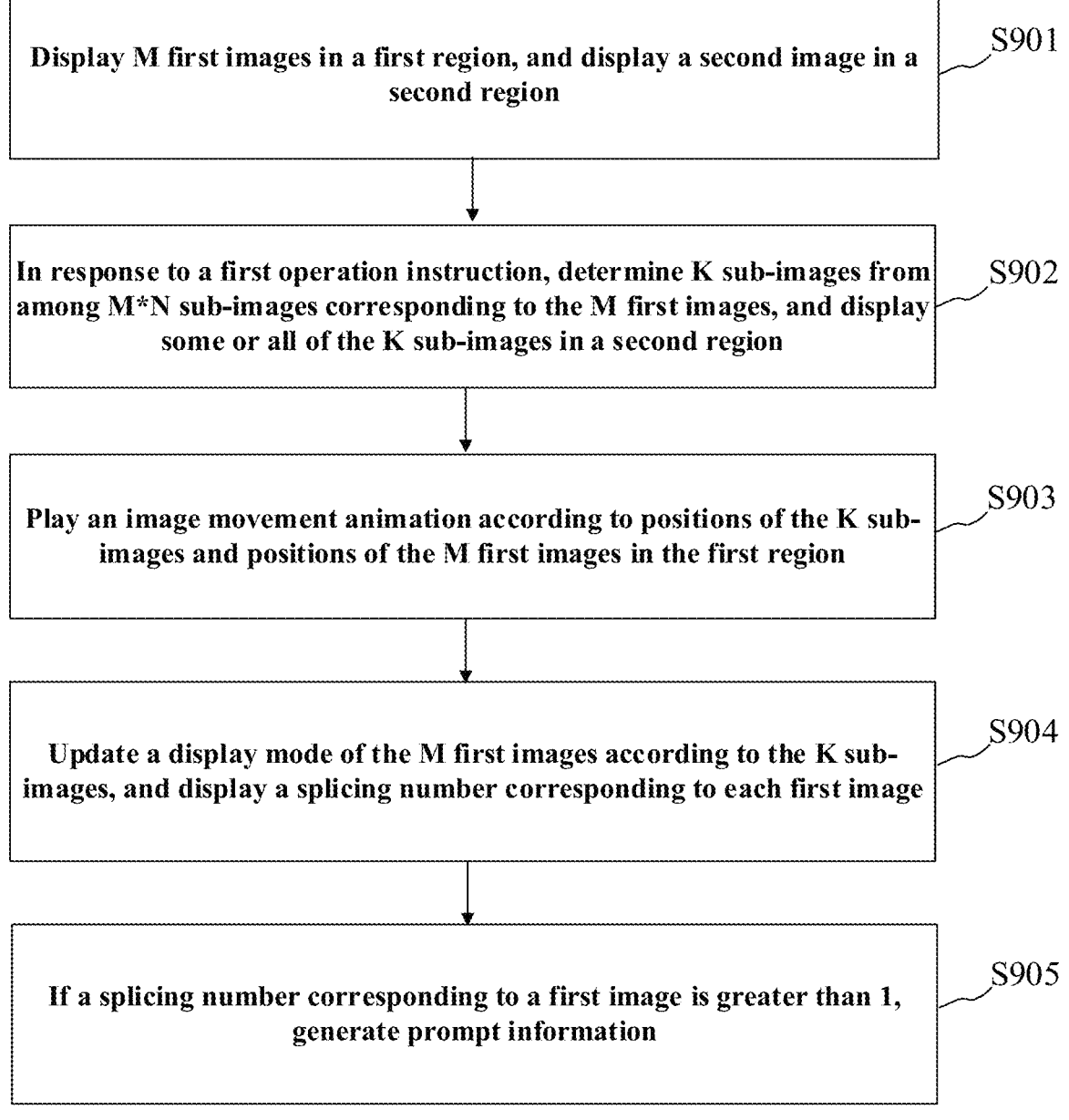

Display M first images in a first region, and display a second image in a second region ⟋S901

In response to a first operation instruction, determine K sub-images from among M*N sub-images corresponding to the M first images, and display some or all of the K sub-images in a second region ⟋S902

Play an image movement animation according to positions of the K sub-images and positions of the M first images in the first region ⟋S903

Update a display mode of the M first images according to the K sub-images, and display a splicing number corresponding to each first image ⟋S904

If a splicing number corresponding to a first image is greater than 1, generate prompt information ⟋S905

FIG.9

IMAGE PROCESSING METHOD AND APPARATUS, AND DEVICE

CROSS-REFERENCE TO RELATED APPLICATIONS

The present disclosure is a U.S. National Stage Application of PCT Application Serial No. PCT/CN2022/110090, filed Aug. 3, 2022, which claims priority to Chinese Patent Application No. 202110902826.7, filed on Aug. 6, 2021, and entitled "IMAGE PROCESSING METHOD AND APPARATUS, AND DEVICE", the disclosures of which are incorporated herein by reference in their entireties.

FIELD

Embodiments of the present disclosure relate to the technical field of image processing, and in particular, to an image processing method and apparatus, and a device.

BACKGROUND

In order to improve interactions between a terminal device and a user, the terminal device can display images in a preset display region according to an operation of the user.

At present, when the terminal device acquires all image fragments corresponding to a complete image, the terminal device can display the complete image. For example, the terminal device acquires, in response to a clicking operation of the user, image fragments corresponding to a plurality of complete images. When a plurality of image fragments can be spliced into a complete image, the terminal device displays the complete image.

However, in the aforementioned acquisition process, the user needs to perform the clicking operation for many times, which prevents an image from being displayed on a display screen in a timely manner, resulting in a poor image display effect.

SUMMARY

Embodiments of the present disclosure provide an image processing method and apparatus, and a device, which are configured to solve the technical problems of poor image display effect in the related technology.

In a first aspect, the embodiments of the present disclosure provide an image processing method, including:

displaying M first images in a first region and displaying a second image in a second region, wherein each first image corresponds to N sub-images, the N sub-images are images formed by dividing the first image into N parts, M is an integer greater than or equal to 1, and N is an integer greater than 1;

in response to a first operation instruction, determining K sub-images from the M*N sub-images corresponding to the M first images, and displaying some or all of the K sub-images in a second region, wherein K is an integer greater than or equal to 1; and updating a display mode of the K sub-images in the M first images, and displaying a splicing number corresponding to each first image, wherein the splicing number is a number of first images formed by splicing the K sub-images.

In a second aspect, the embodiments of the present disclosure provide an image processing apparatus, including a display module, a determining module, and an update module, wherein the display module is configured to: display M first images in a first region and display a second image in a second region, wherein each first image corresponds to N sub-images, the N sub-images are images formed by dividing the first image into N parts, M is an integer greater than or equal to 1, and N is an integer greater than 1;

the determining module is configured to: in response to a first operation instruction, determine K sub-images from the M*N sub-images corresponding to the M first images, and display some or all of the K sub-images in a second region, wherein K is an integer greater than or equal to 1; and the update module is configured to: update a display mode of the K sub-images in the M first images, and display a splicing number corresponding to each first image, wherein the splicing number is a number of first images formed by splicing the K sub-images.

In a third aspect, the embodiments of the present disclosure provide an electronic device, including: a processor and a memory, wherein the memory stores computer-executable instructions; and the processor executes the computer-executable instructions stored in the memory to cause the at least one processor to perform the image processing method in the first aspect and in various possible designs of the first aspect.

In a fourth aspect, the embodiments of the present disclosure provide a computer-readable storage medium, wherein the computer-readable storage medium stores computer-executable instructions; and a processor, when executing the computer-executable instructions, implements the image processing method in the first aspect and in various possible designs of the first aspect.

In a fifth aspect, the embodiments of the present disclosure provides a computer program product, including a computer program, wherein the computer program, when executed by a processor, implements the image processing method in the first aspect and in various possible designs of the first aspect.

In a sixth aspect, the embodiments of the present disclosure provide a computer program, including program instructions. The program instructions, when executed by a computer, implement the image processing method in the first aspect and in various possible designs of the first aspect.

BRIEF DESCRIPTION OF THE DRAWINGS

In order to describe the technical solutions in the embodiments of the present disclosure or in the related technology more clearly, the following briefly introduces the accompanying drawings for describing the embodiments or the related technology. Apparently, the accompanying drawings in the following description show some embodiments of the present disclosure, and a person of ordinary skill in the art may still derive other drawings from the accompanying drawings without creative efforts.

FIG. 9 is a schematic diagram of a process of another image processing method according to an embodiment of the present disclosure;

DETAILED DESCRIPTION OF EMBODIMENTS

In order to make the objectives, technical solutions, and advantages of the embodiments of the present disclosure clearer, the technical solutions in the embodiments of the present disclosure are clearly described below with reference to the accompanying drawings in the embodiments of the present disclosure. Apparently, the described embodiments are merely some rather than all of the embodiments of the present disclosure. The embodiments of the present disclosure are obtained by those of ordinary skill in the art without creative efforts.

Figure 1:
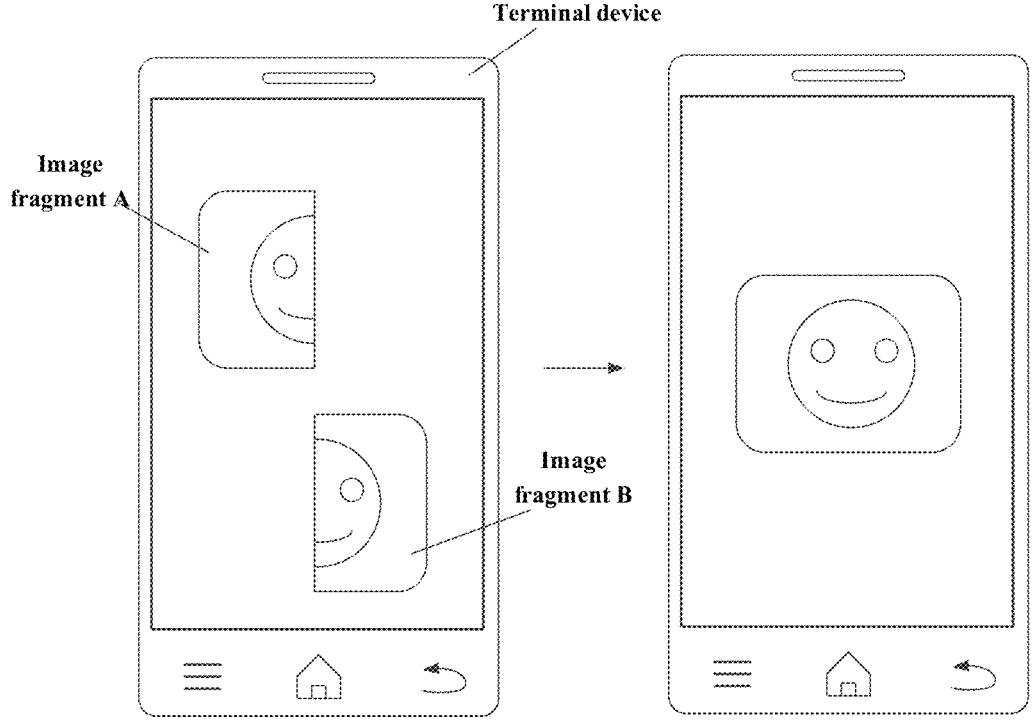
FIG. 1 is a schematic diagram of an application scenario according to an embodiment of the present disclosure.

The following will introduce an application scenario applicable to the embodiments of the present disclosure in conjunction with FIG. 1.

FIG. 1 is a schematic diagram of an application scenario according to an embodiment of the present disclosure. Referring to FIG. 1, a terminal device is included. The terminal device can acquire a plurality of image fragments. For example, the terminal device acquires an image fragment A and an image fragment B, and displays the image fragment A and the image fragment B on a display screen.

Referring to FIG. 1, since the image fragment A and the image fragment B can be spliced into a smiling face image, the terminal device can splice the image fragment A and the image fragment B into a complete smiling face image and display the smiling face image on the display screen.

In the related technology, when the terminal device acquires all image fragments corresponding to a complete image, the terminal device can display the complete image. For example, the terminal device acquires, in response to a clicking operation of a user, 10 image fragments. If the 10 image fragments can be spliced into two complete images, the terminal device displays the two complete images. However, when the terminal device acquires a plurality of image fragments, the plurality of image fragments are stored at preset positions. The user can determine a number and type of the image fragments acquired by the terminal device by performing the clicking operation for many times, thus determining whether a complete image can be formed. In this way, the user cannot acquire the type and number of the image fragments in a timely manner, resulting in a poor image display effect.

In order to solve the technical problem of a poor image display effect in the related technology, the embodiments of the present disclosure provide an image processing method. M first images are displayed in a first region, and a second image is displayed in the second region. Each first image corresponds to N sub-images. The N sub-images are images formed by dividing the first image into N parts, wherein M is an integer greater than or equal to 1, and N is an integer greater than or equal to 1. In response to a first operation instruction, K sub-images are determined from the M*N sub-images corresponding to the M first images, and different images among the K sub-images are displayed in the second region. A region where the K sub-images in the M first images are located is highlighted, and a splicing number corresponding to each first image is displayed, wherein the splicing number is a number of first images formed by splicing the K sub-images. If a splicing number corresponding to a first image is greater than 1, prompt information is generated. In this way, when the terminal device acquires the K sub-images, the K sub-images can be displayed in the second region, so that the user can accurately acquire types of the sub-images. The displaying of the M first images in the first region is updated according to the K sub-images, and the splicing quantities corresponding to the first images are displayed. Splicable first images can be accurately acquired without an operation of the user, which reduces the complexity of operation and displays the first images in a timely manner, thus improving the image display effect.

The technical solutions of the present disclosure and how to solve the aforementioned technical problem by the technical solutions of the present disclosure will be described in detail below by specific embodiments. The following specific embodiments can be combined with each other, and the same or similar concepts or processes may not be repeated in some embodiments. The following will describe the embodiments of the present disclosure in conjunction with the accompanying drawings.

Figure 2:
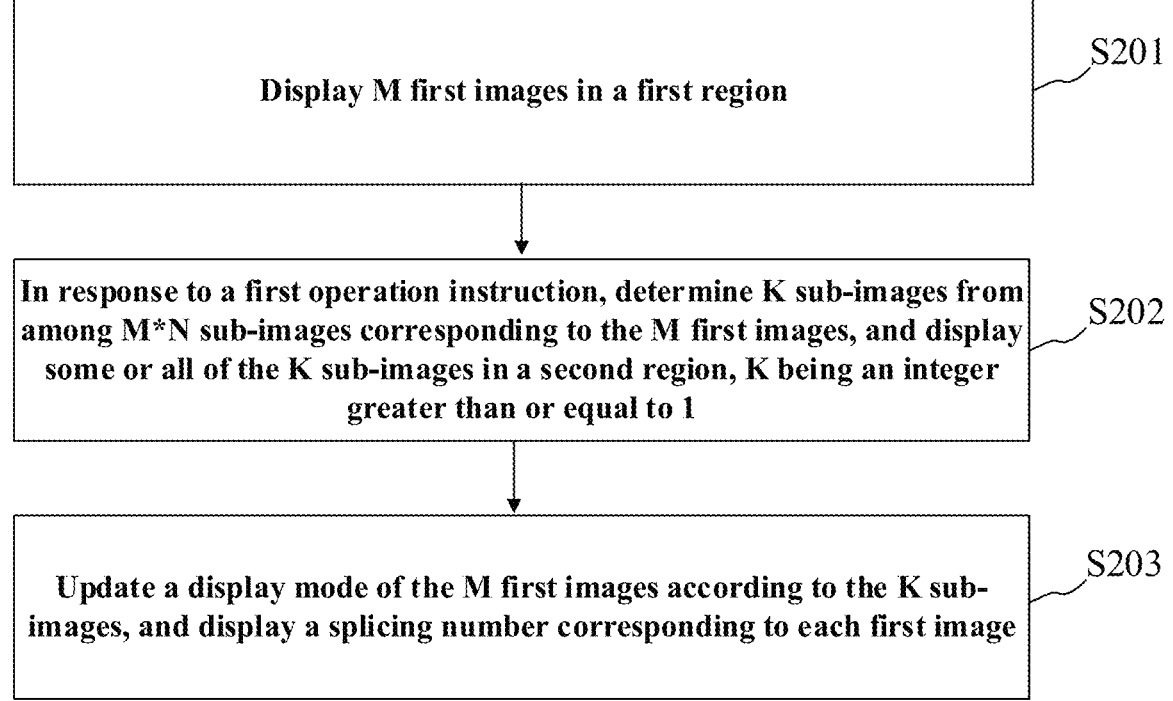
FIG. 2 is a flowchart of an image processing method according to an embodiment of the present disclosure.

FIG. 2 is a flowchart of an image processing method according to an embodiment of the present disclosure. Referring to FIG. 2, the method can include:

S201. M first images are displayed in a first region.

An executive body of the embodiments of the present disclosure can be a terminal device or an image processing apparatus in the terminal device. The image processing apparatus can be implemented through software or a combination of software and hardware. In a possible implementation, the terminal device is any device with an image processing function and a display function. For example, the terminal device can be a mobile phone, a laptop, a desktop computer, and another device.

In a possible implementation, a display screen of the terminal device includes a first region and a second region. For example, the first region can be arranged above the second region. The M first images are displayed in the first region, and M is an integer greater than or equal to 1. In a possible implementation, the first image can be any preset image. For example, the first image can be an image of the sun, an image of the moon, a rocket image, and the like. In a possible implementation, the M first images in the first region are different from one another. For example, the first region includes three images which are different from one another.

In a possible implementation, when the M first images are displayed in the first region, the M first images can be displayed in one row or multiple rows. For example, if a number of the first images is seven, the seven first images will be displayed in one row in the first region. If a number of first images is 14, the 14 first images will be displayed in two rows in the first region.

Each first image corresponds to N sub-images. The N sub-images are images formed by dividing the first image into N parts, and N is an integer greater than 1. For example, if the first image is divided into two parts, the first image corresponds to two sub-images, and the two sub-images can form the first image. In a possible implementation, the first image can be averagely divided into N parts to obtain N sub-images. For example, if the first image is divided into two parts, the first image will be averagely divided into two parts horizontally. If the first image is divided into three parts, the first image will be averagely divided into three parts every 120 degrees around a center of the first image. In a possible implementation, areas of the N sub-images corresponding to the first image can be different. For example, the first image can be randomly divided into N sub-images, and the N sub-images can be combined into the first image.

In a possible implementation, a plurality of second images can be displayed in the second region. The second images can be preset images. The second images can be the same or different images. For example, four images of the sun are displayed in a first row of the second row, and four images of the moon are displayed in a second row of the second region.

The first images and the second images displayed in the screen of the terminal device will be explained below in conjunction with FIG. 3.

Figure 3:
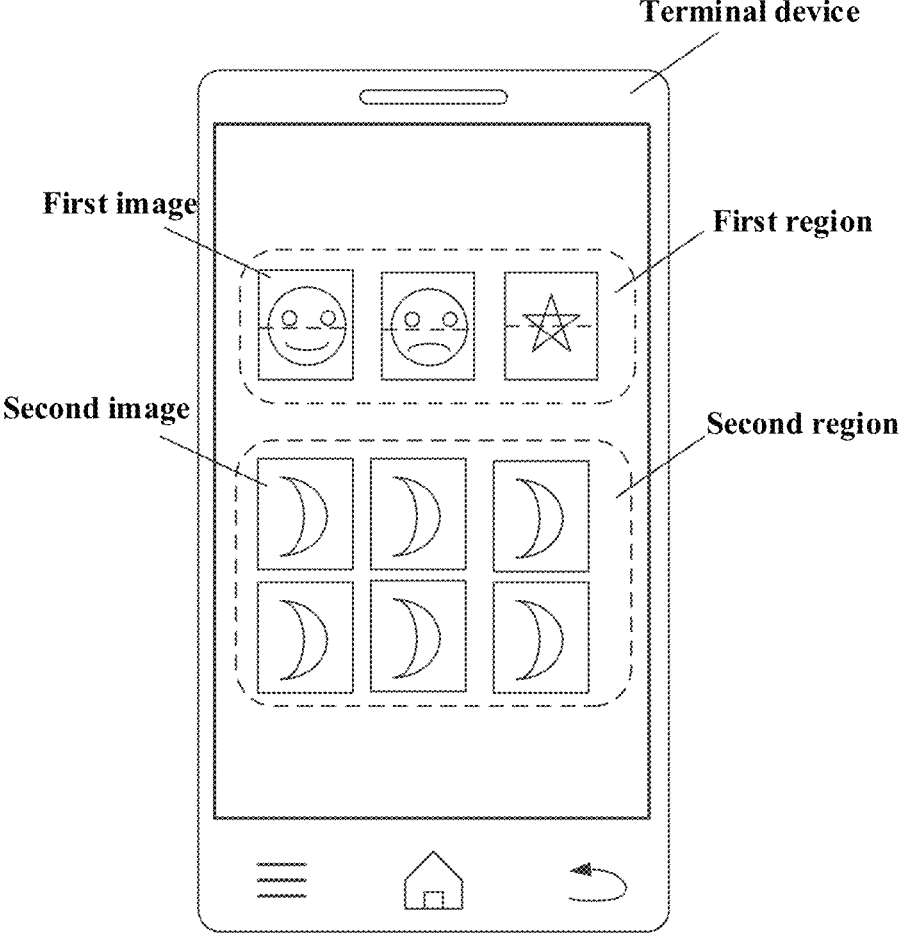
FIG. 3 is a schematic diagram of displaying first images and second images according to an embodiment of the present disclosure.

FIG. 3 is a schematic diagram of displaying first images and second images according to an embodiment of the present disclosure. FIG. 3 shows a terminal device. A display region of the terminal device includes a first region and a second region. Three first images are displayed in the first region, and the three first images are different from one another. For example, a smiling face image, a crying face image, and a star image are displayed in the first region. Six second images are displayed in the second region, and all the six second images are images of the moon.

Referring to FIG. 3, in the first region, each first image is averagely divided into two sub-images. Each first image includes an upper half sub-image and a lower half sub-image. The upper half sub-image and the lower half sub-image of the same first image can be spliced into a first image.

S202. In response to a first operation instruction, K sub-images are determined from the M*N sub-images corresponding to the M first images, and some or all of the K sub-images are displayed in a second region, wherein K is an integer greater than or equal to 1.

In a possible implementation, the first operation instruction can be an instruction corresponding to a clicking operation performed by a user on the screen of the terminal device. The K sub-images can be determined according to the first operation instruction. In a possible implementation, the display region of the terminal device can further include controls corresponding to acquiring sub-images, and K can be determined according to the clicking operation performed by the user on the controls corresponding to acquiring sub-images. For example, if the user clicks on a control for displaying 10 images on the display screen of the terminal device, K will be 10. If the user clicks on a control for displaying 100 images on the display screen of the terminal device, K will be 100.

In a possible implementation, the user can also directly perform the clicking operation on a plurality of second images displayed in the second region to obtain sub-images. For example, the user can click on any second image to obtain a sub-image.

The M*N sub-images are all images corresponding to N parts obtained by dividing each first image. For example, if a number of the first images is 10, and each first image is averagely divided into two parts, a number of the M*N sub-images is 20.

The M*N sub-images corresponding to the M first images will be explained below in conjunction with FIG. 4.

Figure 4:
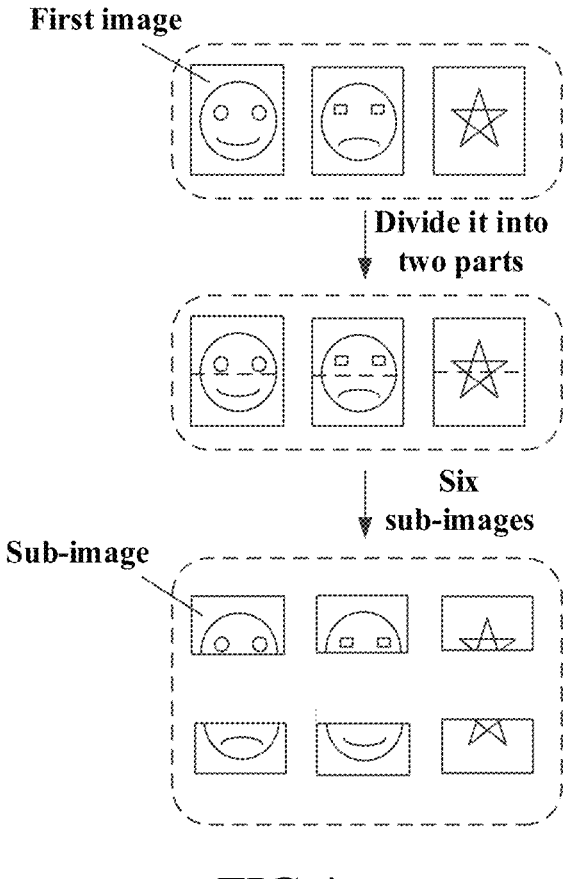
FIG. 4 is a schematic diagram of a sub-image according to an embodiment of the present disclosure.

FIG. 4 is a schematic diagram of a sub-image according to an embodiment of the present disclosure. FIG. 4 shows three first images. The first images include a smiling face image, a crying face image, and a star image. Each first image is divided into an upper sub-image and a lower sub-image, thus obtaining six sub-images. The sub-images include an upper half image of the smiling face image, a lower half image of the smiling face image, an upper half image of the crying face image, a lower half image of the crying face image, an upper half image of the star image, and a lower half image of the star image.

In a possible implementation, when the terminal device receives the first operation instruction of the user, the terminal device can randomly determine the K sub-images from the M*N sub-images according to the first operation instruction, wherein the K sub-images can be the same or different. For example, if K is less than or equal to M*N, some of the K sub-images are the same, or all the K sub-images are different, or all the K sub-images are the same. If K is greater than M*N, it is inevitably that some of the K sub-images are the same.

After the terminal device determines the K sub-images, the K sub-images can be displayed in the second region. In a possible implementation, the terminal device can display some or all of the K sub-images in the second region. For example, the terminal device can display all the sub-images in the second region, or can display some of the sub-images in the second region. The K sub-images can be displayed in the second region according to the following feasible implementation: displaying L sub-images among the K sub-images in the second region. The L sub-images are different images, wherein L is greater than or equal to 1, and L is less than or equal to K. For example, if the K sub-images randomly determined by the terminal device from a plurality of sub-images according to the first operation instruction are different from one another, the terminal device can display the K sub-images in the second region. If some of the K sub-images randomly determined by the terminal device from a plurality of sub-images according to the first operation instruction are the same, the terminal device only displays different sub-images in the second region. For example, if the terminal device determines 10 sub-images from the M*N sub-images, and two of the 10 sub-images are the same, the terminal device displays nine different sub-images in the second region.

In a possible implementation, the L sub-images among the K sub-images can be displayed in the second region according to the following feasible implementation: displaying the L sub-images at P image display positions of the second region, wherein P is an integer greater than or equal to 1. In a possible implementation, the image display positions can be randomly set in the second region. For example, two rows of image display positions can be set in the second region, and each row includes four image display positions. One image display position is used for displaying N sub-images. For example, if each first image is divided into two sub-images, one image display position displays two sub-images. In a possible implementation, the N sub-images, which can be spliced into one of the first images, among the L sub-images are displayed in one image display position. For example, if a sub-image A and a sub-image B among the L sub-images can be spliced into a first image A, the sub-image A and the sub-image B are displayed in one image display position.

In a possible implementation, if the L sub-images do not include sub-images that can be spliced into a first image, the L sub-images are randomly displayed in the image display position. For example, if the L sub-images include a sub-image A, a sub-image B, a sub-image C, and a sub-image D, and any two sub-images cannot be spliced into a first image, the sub-image A and the sub-image B can be displayed in the first image display position, and the sub-image C and the sub-image D can be displayed in the second image display position.

In a possible implementation, if all the L sub-images can be spliced into corresponding first images, the corresponding sub-images are displayed in the image display positions according to a preset display order. For example, if the L sub-images include the sub-image A and the sub-image B corresponding to the first image A, and the sub-image C and the sub-image D corresponding to the first image B, and the preset display order is that the first image A is in front of the first image B, the sub-image A and the sub-image B are displayed in the first image display position, and the sub-image C and the sub-image D are displayed in the second image display position.

A display process of the K sub-images will be explained below in conjunction with FIG. 5.

Figure 5:
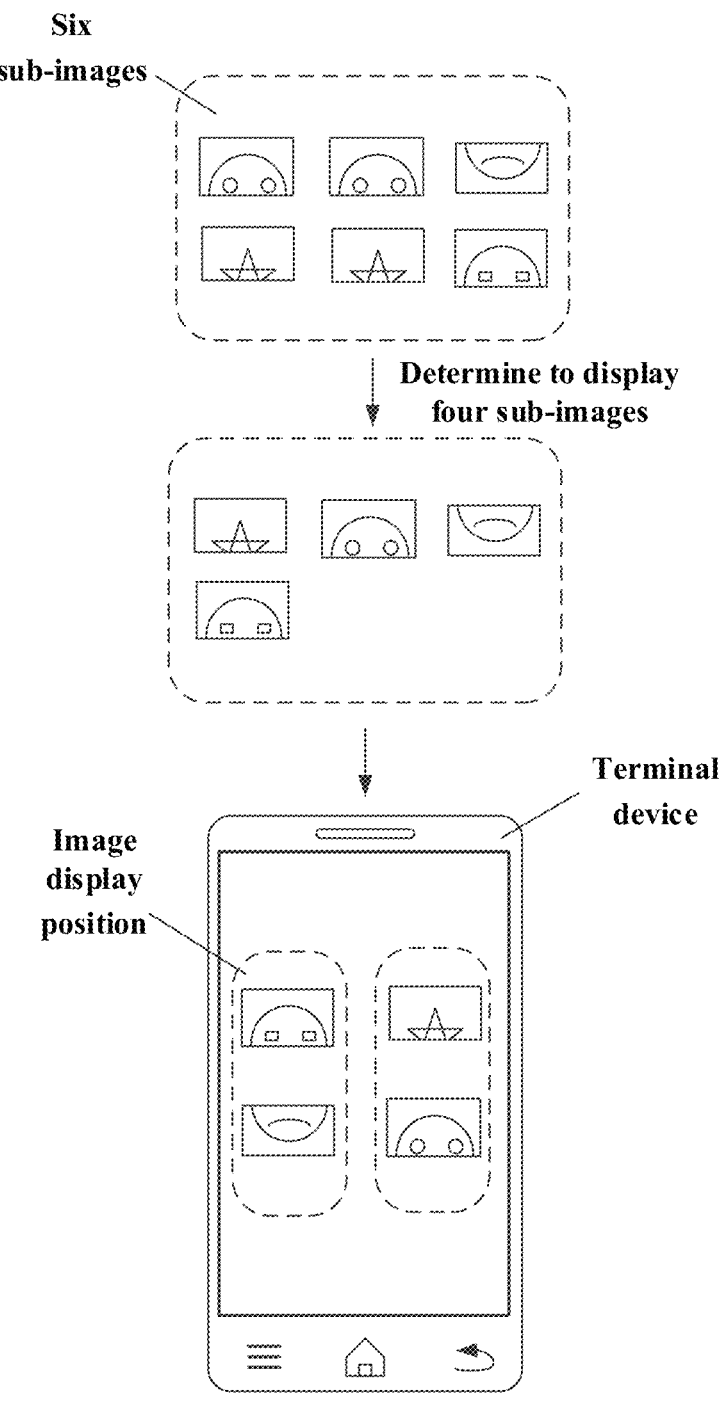
FIG. 5 is a schematic diagram of a process of displaying K sub-images according to an embodiment of the present disclosure.

FIG. 5 is a schematic diagram of a process of displaying K sub-images according to an embodiment of the present disclosure. Referring to FIG. 5, six sub-images acquired by the terminal device respectively include upper half images of two smiling face images, upper half images of two star images, an upper half image of a crying face image, and a lower half image of a crying face image.

Referring to FIG. 5, the terminal device determines that four different sub-images displayed among the six sub-images are the upper half image of the star image, the upper half image of the smiling face image, the upper half image of the crying face image, and the lower half image of the crying face image.

Referring to FIG. 5, since the upper half image of the crying face image and the lower half image of the crying face image can be spliced into a crying face image, the upper half image of the crying face image and the lower half image of the crying face image are displayed in the first image display position of the terminal device, and the upper half image of the smiling face image and the upper half image of the star image are displayed in the second image display position of the terminal device.

In a possible implementation, if P is greater than or equal to a preset threshold, adjacent image display positions among the P image display positions have overlap regions. For example, if 20 image display positions are set in the second region, the 20 image display positions have overlap regions.

Overlap display of an image display position will be explained below in conjunction with FIG. 6.

Figure 6:
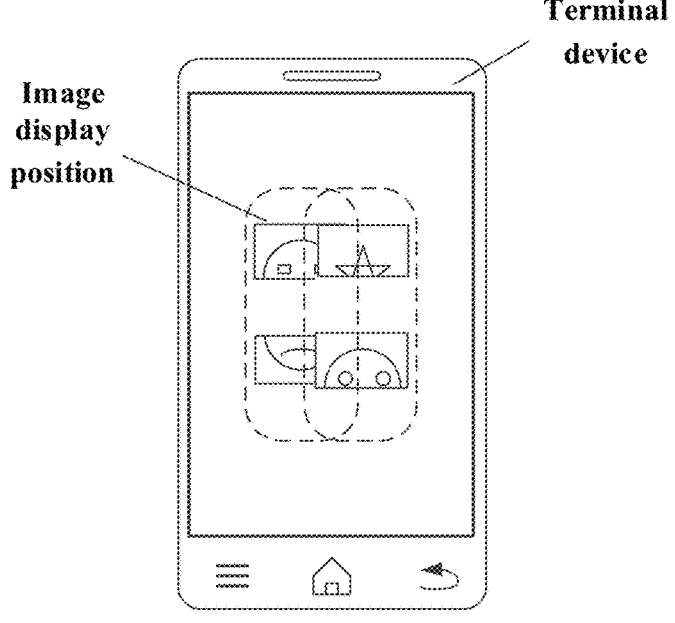
FIG. 6 is a schematic diagram of a process of image displaying according to an embodiment of the present disclosure.

FIG. 6 is a schematic diagram of a process of image displaying according to an embodiment of the present disclosure. Referring to FIG. 6, a terminal device is included. The terminal device includes two image display positions. An upper half image of a crying face image and a lower half image of the crying face image are displayed in the first image display position, while an upper half image of a star image and a lower half image of a smiling face image are displayed in the second image display position.

Referring to FIG. 6, if a space in the display screen of the terminal device is small, the first image display position and the second image display position can be displayed in a partially overlapping manner. In this way, all the sub-images in the second image display position and some of all the sub-images in the first image display position can be displayed, which improves the space utilization rate of the display screen.

In a possible implementation, before the terminal device displays the K sub-images in the second region, the terminal device can play a movement animation showing that a plurality of second images move to a center of the second region. After the playing of the animation is completed, the terminal device displays the K sub-images in the second region. This can improve the image display effect.

S203. A display mode of the M first images is updated according to the K sub-images, and a splicing number corresponding to each first image is displayed.

The display mode of the M first images can be updated according to two feasible implementations below:

One feasible implementation is as follows:

highlighting a region where the K sub-images in the M first images are located. For example, a first image A is averagely divided into a sub-image A and a sub-image B. The sub-image A is an upper half region of the first image A, and the sub-image B is a lower half of the first image A. If the K sub-images determined according to the first operation instruction include the sub-image A, the upper half region of the first image A is highlighted.

A process of highlighting a region where a sub-image is located will be explained below in conjunction with FIG. 7.

Figure 7:
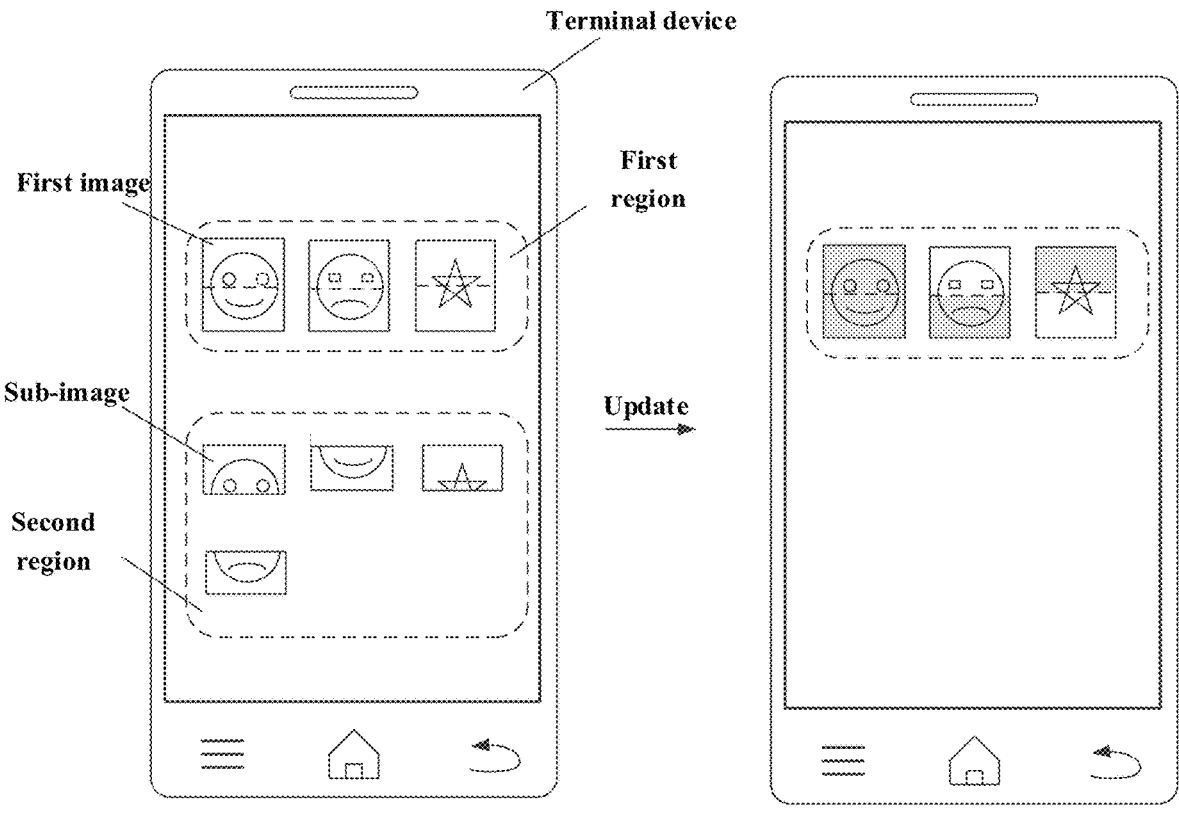
FIG. 7 is a schematic diagram of a process of highlighting according to an embodiment of the present disclosure.

FIG. 7 is a schematic diagram of a process of highlighting according to an embodiment of the present disclosure. Referring to FIG. 7, a terminal device is included. The terminal device includes a first region and a second region. The first region includes three first images, and each first image is divided into an upper sub-image and a lower sub-image The second region includes four sub-images acquired by the terminal device.

Referring to FIG. 7, the four sub-images acquired by the terminal device respectively include an upper half image of a smiling face image, a lower half image of the smiling face image, an upper half image of a star image, and a lower half image of the crying face image.

Referring to FIG. 7, displaying of three first images in the first region is updated according to the four sub-images. In the first region, the upper half region of the smiling face image, the lower half region of the smiling face image, the lower half region of the crying face image, and the upper half region of the star image are highlighted. In this way, a user can quickly determine the sub-images acquired by the terminal device according to the image displaying in the first region, without performing the clicking operation for many times, so that the operation complexity of image displaying is reduced, and the image display effect is improved.

Another feasible implementation is as follows:

labeling a region where the K sub-images in the M first images are located. The labeling processing can be performed on a preset position in the region where K sub-images are located. For example, a center of the region where the K sub-images are located can be labeled with a red dot, a shadow, and the like. For example, if a first image A includes a sub-image A and a sub-image B, the sub-image A is an upper half of the first image A, and the sub-image B is a lower half of the first image A. If the K sub-images include the sub-image A, a red dot is displayed in a center of the upper half of the first image A.

The splicing number is a number of first images that are formed by splicing the K sub-images. For example, if the splicing number is three, digit 3 is displayed at preset positions of the first images to indicate that three first images can be formed by splicing the K sub-images.

In a possible implementation, if a splicing number corresponding to a first image is greater than 1, prompt information is generated. For example, if the K sub-images can be spliced into a first image, the terminal device generates prompt information. For example, if the K sub-images acquired by the terminal device can be spliced into three first images A, the terminal device generates prompt information corresponding to the first images A.

In a possible implementation, the prompt information can be a text or an image. In a possible implementation, the prompt information can prompt that N sub-images can be combined into a first image. For example, text information prompts that N sub-images can be combined into a first image, or N sub-images are spliced together to form an animated image of a first image to prompt that the N sub-images can be combined into a first image. A process of generating the prompt information will be explained below in conjunction with FIG. 8.

Figure 8:
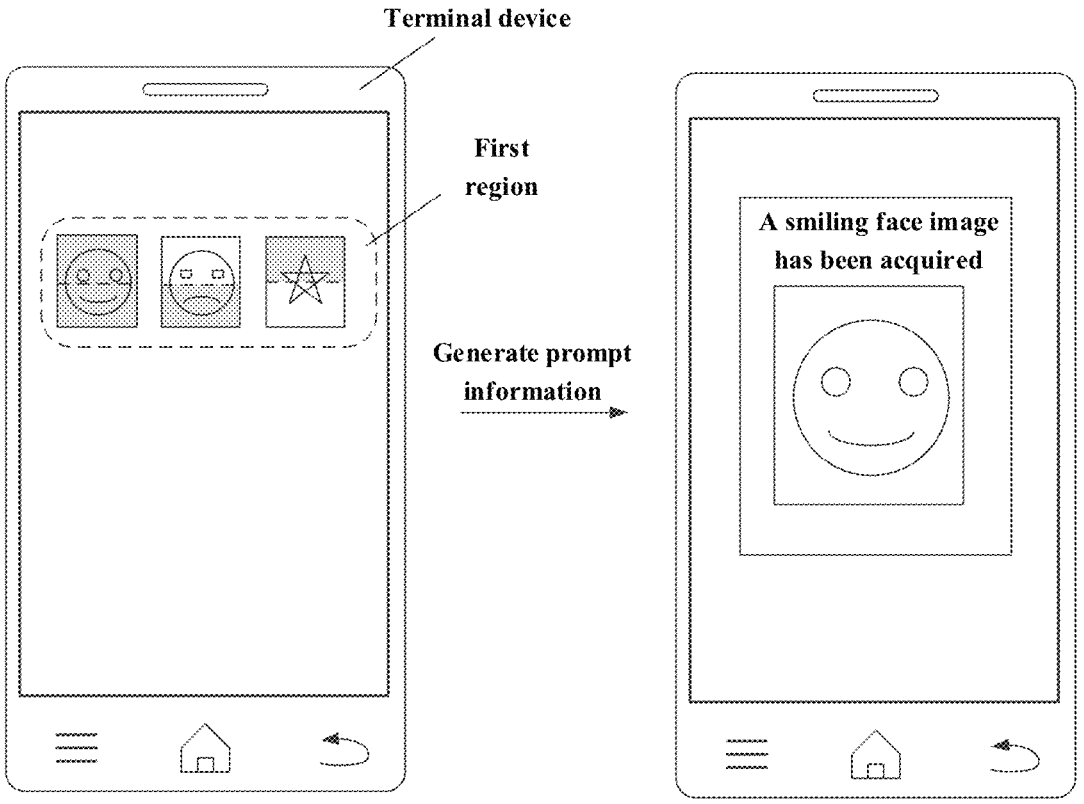
FIG. 8 is a schematic diagram of a process of generating prompt information according to some embodiments of the present disclosure.

FIG. 8 is a schematic diagram of a process of generating prompt information according to some embodiments of the present disclosure. Referring to FIG. 8, a terminal device is included. A first region of the terminal device includes three first images. In the first region, an upper half region and a lower half region of a smiling face image are highlighted; a lower half region of a crying face image is highlighted; and an upper half region of a star image is highlighted.

Referring to FIG. 8, since a plurality of sub-images acquired by the terminal device can be spliced into a smiling face image, the terminal device can generate prompt information "A smiling face image has been acquired", and displays the smiling face image in the display screen.

The embodiments of the present disclosure provide an image processing method. M first images are displayed in a first region, and a second image is displayed in the second region.

Each first image corresponds to N sub-images. The N sub-images are images formed by dividing the first image into N parts. In response to a first operation instruction, K sub-images are determined from the M*N sub-images corresponding to the M first images, and different images among the K sub-images are displayed in the second region. A region where the K sub-images in the M first images are located is highlighted, and a splicing number corresponding to each first image is displayed, wherein the splicing number is a number of first images formed by splicing the K sub-images. If a splicing number corresponding to a first image is greater than 1, prompt information is generated. According to the method described above, when the terminal device acquires the K sub-images, the K sub-images can be displayed in the second region, so that the user can accurately acquire types of the sub-images. The displaying of the M first images in the first region is updated according to the K sub-images, and the splicing quantities corresponding to the first images are displayed. Splicable first images can be accurately acquired without an operation of the user, which reduces the complexity of operation and displays the first images in a timely manner, thus improving the image display effect.

Based on the embodiment shown in FIG. 2, the image processing method described above will be explained in detail below in conjunction with FIG. 9.

FIG. 9 is a schematic diagram of a process of another image processing method according to an embodiment of the present disclosure. Referring to FIG. 9, the method includes:

S901. M first images are displayed in a first region, and a second image is displayed in a second region.

Each first image corresponds to N sub-images, the N sub-images are images formed by dividing the first image into N parts, M is an integer greater than or equal to 1, and N is an integer greater than 1.

It should be noted that the execution process of step S901 can refer to step S201, which will not be described in detail in the embodiments of the present disclosure.

S902. In response to a first operation instruction, K sub-images are determined from the M*N sub-images corresponding to the M first images, and some or all of the K sub-images are displayed in a second region, wherein K is an integer greater than or equal to 1.

It should be noted that the execution process of step S902 can refer to step S202, which will not be described in detail in the embodiments of the present disclosure.

S903. An image movement animation is played according to positions of the K sub-images and positions of the M first images in the first region.

The image movement animation includes: an animation showing that each sub-image displayed in the second region moves towards the same sub-image in the first region. For example, 10 sub-images are displayed in the second region. Before update of displaying of the first images in the first region, the 10 sub-images in the second region move to regions of the corresponding first images.

In a possible implementation, if sizes of the sub-images of the first images in the first region are different from sizes of the K sub-images displayed in the second region, the sizes of the K sub-images are adaptively transformed as the sub-images move towards the same sub-images in the first region. For example, if the sizes of the sub-images corresponding to the first images is smaller than the sizes of the K sub-images displayed in the second region, as the K sub-images displayed in the second region are moved towards the same sub-images in the first region, the K sub-images in the second region are gradually narrowed until they have the same sizes as the sizes of the sub-images in the first region. If the sizes of the sub-images corresponding to the first region are greater than the sizes of the K sub-images displayed in the second region, as the K sub-images displayed in the second region move towards the same sub-images in the first region, the K sub-images in the second region are gradually enlarged until they have the same sizes as the sizes of the sub-images in the first region.

A process of playing an image movement animation will be explained below in conjunction with FIG. 10.

Figure 10:
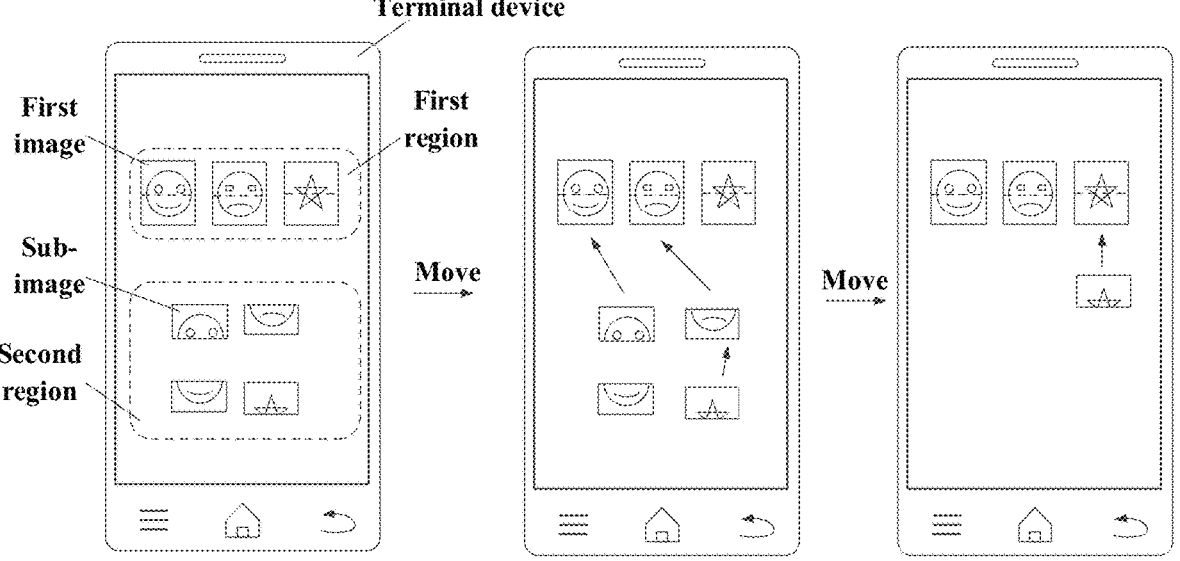
FIG. 10 is a schematic diagram of a process of playing an image movement animation according to an embodiment of the present disclosure.

FIG. 10 is a schematic diagram of a process of playing an image movement animation according to an embodiment of the present disclosure. FIG. 10 shows a terminal device. A first region of the terminal device includes three first images. Each first image is divided into an upper sub-image and a lower sub-image. Four sub-images acquired by the terminal device respectively include an upper half image of a smiling face image, a lower half image of the smiling face image, a lower half image of a crying face image, and an upper half image of a star image.

Referring to FIG. 10, the four sub-images are respectively moved to the positions of the corresponding sub-images in the first region. For example, the upper half image of the smiling face image is moved to an upper half region of the smiling face image in the first region; the lower half image of the smiling face image is moved to a lower half region of the smiling face image in the first region; the lower half image of the crying face image is moved to a lower half region of the crying face image in the first region; the upper half image of the star image is moved to an upper half region of the star image in the first region.

S904. A display mode of the M first images is updated according to the K sub-images, and a splicing number corresponding to each first image is displayed.

The splicing number is a number of first images that are formed by splicing the K sub-images. In a possible implementation, for any one of the M first images, the splicing number corresponding to the first image can be displayed according to the following feasible implementation: when the splicing number corresponding to the first image is greater than or equal to 1, displaying the splicing number corresponding to the first image. For example, if the K sub-images in the second region can be spliced into two first images A and three first images B, the splicing number of the first images A and the splicing number of the first images B are displayed.

In a possible implementation, the splicing number corresponding to the first image can be displayed according to the following feasible implementation: displaying the splicing number in a display region corresponding to the first image. The display region is any one of: an upper left corner of a region where the first image is located; or, an upper right corner of a region where the first image is located; or, a lower left corner of a region where the first image is located; or, a lower right corner of a region where the first image is located. For example, if the K sub-images can be spliced into three first images A, digit 3 is displayed at the upper right corner of the first image A. In this way, when the terminal device acquires a plurality of sub-images, a user can directly acquire, from the first images displayed in the first region, first images that can be formed by splicing the sub-images, thereby improving the image display effect.

S905. If a splicing number corresponding to a first image is greater than 1, prompt information is generated.

It should be noted that the execution process of step S905 can refer to step S203, and this disclosed embodiment will not be further elaborated here.

The embodiments of the present disclosure provide an image processing method. M first images are displayed in a first region, and a second image is displayed in the second region. In response to a first operation instruction, K sub-images are determined from the M*N sub-images corresponding to the M first images, and some or all of the K sub-images are displayed in the second region. An image movement animation is played according to positions of the K sub-images and positions of the M first images in the first region. A display mode of the K sub-images in the M first images is updated, and a splicing number corresponding to each first image is displayed. If a splicing number corresponding to a first image is greater than 1, prompt information is generated. According to the method described above, before the display mode of the K sub-images in the M first images is updated, the animation showing that the K sub-images move to the regions corresponding to the M first images. In this way, the image display effect can be improved. Furthermore, when the terminal device acquires the K sub-images, the K sub-images can be displayed in the second region, so that the user can accurately acquire types of the sub-images. The displaying of the M first images in the first region is updated according to the K sub-images, and the splicing quantities corresponding to the first images are displayed. Splicable first images can be accurately acquired without an operation of the user, which reduces the complexity of operation and displays the first images in a timely manner, thus improving the image display effect.

Based on any embodiment described above, the image processing process described above will be explained below in conjunction with FIG. 11.

Figure 11:
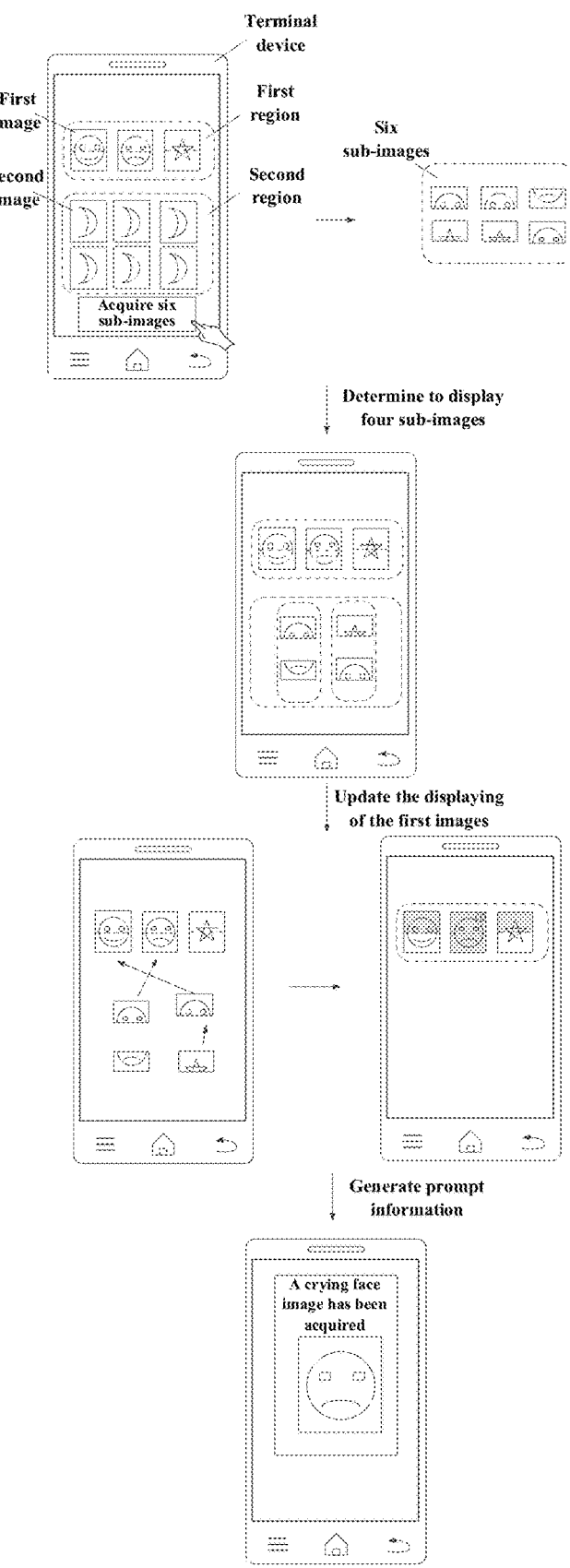
FIG. 11 is a schematic diagram of an image processing process according to an embodiment of the present disclosure.

FIG. 11 is a schematic diagram of an image processing process according to an embodiment of the present disclosure. Referring to FIG. 11, a terminal device is included. A display region of the terminal device includes a first region, a second region, and an icon for acquiring six sub-images. In a possible implementation, the icon for acquiring six sub-images can be randomly set. For example, the display region can include an icon for acquiring one sub-image, an icon for acquiring 10 sub-images, and an icon for acquiring 100 sub-images. The present disclosure does not limit this. Three first images are displayed in the first region, and the three first images are different from one another. For example, a smiling face image, a crying face image, and a star image are displayed in the first region. Six second images are displayed in the second region, and all the six second images are images of the moon. In the first region, each first image is averagely divided into two sub-images. Each first image includes an upper half sub-image and a lower half sub-image. The upper half sub-image and the lower half sub-image of the same first image can be spliced into a first image. When a user clicks on the icon for acquiring six sub-images, the terminal device acquires six sub-images.

Referring to FIG. 11, six sub-images acquired by the terminal device respectively include upper half images of two smiling face images, upper half images of two star images, an upper half image of a crying face image, and a lower half image of a crying face image. The terminal device determines that four different sub-images displayed among the six sub-images are the upper half image of the star image, the upper half image of the smiling face image, the upper half image of the crying face image, and the lower half image of the crying face image.

Referring to FIG. 11, the terminal device displays the upper half image of the crying face image and the lower half image of the crying face image in the first image display position, and displays the upper half image of the star image and the lower half image of the smiling face image in the second image display position.

Referring to FIG. 11, the terminal device plays an image movement animation, moves the sub-images in the second region to the positions of the corresponding sub-images in the first region, highlights an upper half region of the smiling face image, an upper half region of the crying face image, a lower half region of the crying face image, and an upper half region of the star image in the first region, and displays digit 1 at an upper right corner of the crying face image. After a preset time period, the terminal device displays prompt information indicating that the crying face image has been acquired, and displays the crying face image on a display screen. In this way, before the display mode of the first images is updated, the animation showing that the sub-images in the second region move to the regions corresponding to the first images. In this way, the image display effect can be improved. Furthermore, when the terminal device acquires a plurality of sub-images, the plurality of sub-images can be displayed in the second region, so that the user can accurately acquire types of the sub-images. The displaying of the first images in the first region is updated according to the plurality of sub-images, and the splicing quantities corresponding to the first images are displayed. Splicable first images can be accurately acquired without an operation of the user, which reduces the complexity of operation and displays the first images in a timely manner, thus improving the image display effect.

Figure 12:
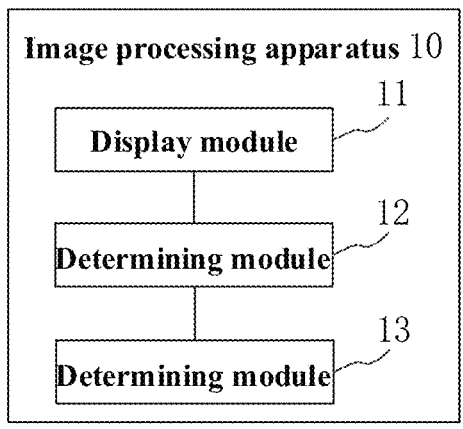
FIG. 12 is a schematic structural diagram of an image processing apparatus according to an embodiment of the present disclosure.

FIG. 12 is a schematic structural diagram of an image processing apparatus according to an embodiment of the present disclosure. Referring to FIG. 12, the image processing apparatus 10 includes a display module 11, a determining module 12, and an update module 13, wherein the display module 11 is configured to: display M first images in a first region and display a second image in a second region, wherein each first image corresponds to N sub-images, the N sub-images are images formed by dividing the first image into N parts, M is an integer greater than or equal to 1, and N is an integer greater than 1;

the determining module 12 is configured to: in response to a first operation instruction, determine K sub-images from the M*N sub-images corresponding to the M first images, and display some or all of the K sub-images in a second region, wherein K is an integer greater than or equal to 1; and the update module 13 is configured to: update a display mode of the K sub-images in the M first images, and display a splicing number corresponding to each first image, wherein the splicing number is a number of the K sub-images which are spliced into the first image.

In a possible implementation, the determining module 12 is specifically configured to:

display L sub-images among the K sub-images in the second region, wherein the L sub-images are different images; L is greater than or equal to 1; and L is less than or equal to K.

In a possible implementation, the determining module 12 is specifically configured to:

display the L sub-images at P image display positions of the second region, wherein P is an integer greater than or equal to 1, wherein an image display position is used for displaying N sub-images; and the N sub-images, which are spliced into one of the first images, among the L sub-images are displayed in one image display position.

In a possible implementation, if P is greater than or equal to a preset threshold, adjacent image display positions among the P image display positions have overlap regions.

In a possible implementation, the update module 13 is specifically configured to:

highlight a region where the K sub-images in the M first images are located; or, label a region where the K sub-images in the M first images are located.

In a possible implementation, the update module 13 is specifically configured to:

when the splicing number corresponding to the first image is greater than or equal to 1, display the splicing number corresponding to the first image.

In a possible implementation, the update module 13 is specifically configured to:

display the splicing number in a display region corresponding to the first image, wherein the display region is any one of the following regions:

an upper left corner of a region where the first image is located; or, an upper right corner of a region where the first image is located; or, a lower left corner of a region where the first image is located; or, a lower right corner of a region where the first image is located.

The image processing apparatus provided by this embodiment can be configured to implement the technical solutions of the method embodiments described above, and an implementation principle and technical effects thereof are similar to those of the method embodiments, so that the image processing apparatus will not be described in detail in this embodiment.

Figure 13:
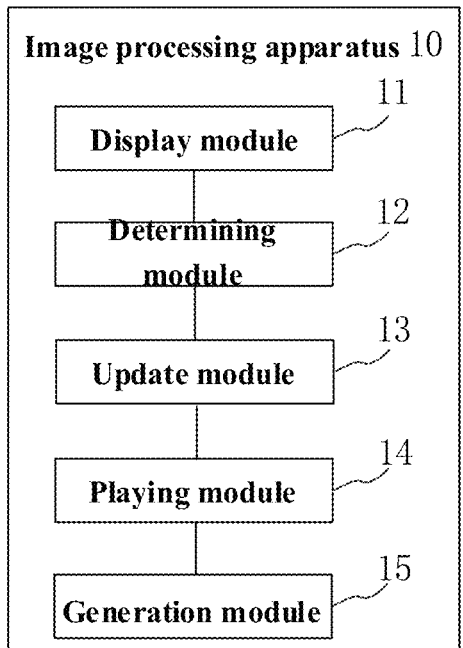
FIG. 13 is a schematic structural diagram of another image processing apparatus according to an embodiment of the present disclosure.

FIG. 13 is a schematic structural diagram of another image processing apparatus according to an embodiment of the present disclosure. Based on the embodiment shown in FIG. 12, referring to FIG. 13, the image processing apparatus 10 further includes a playing module 14. The playing module 14 is configured to:

play an image movement animation according to positions of the K sub-images and positions of the M first images in the first region, wherein the image movement animation includes: an animation showing that each sub-image displayed in the second region moves towards the same sub-image in the first region.

In a possible implementation, the image processing apparatus 10 further includes a generation module 15. The generation module 15 is configured to:

if a splicing number corresponding to a first image is greater than 1, generate prompt information.

The image processing apparatus provided by this embodiment can be configured to implement the technical solutions of the method embodiments described above, and an implementation principle and technical effects thereof are similar to those of the method embodiments, so that the image processing apparatus will not be described in detail in this embodiment.

In order to achieve the above embodiments, the embodiments of the present disclosure further provide an electronic device. A structure of the electronic device provided by the embodiments of the present disclosure will be explained below in conjunction with FIG. 14.

Figure 14:
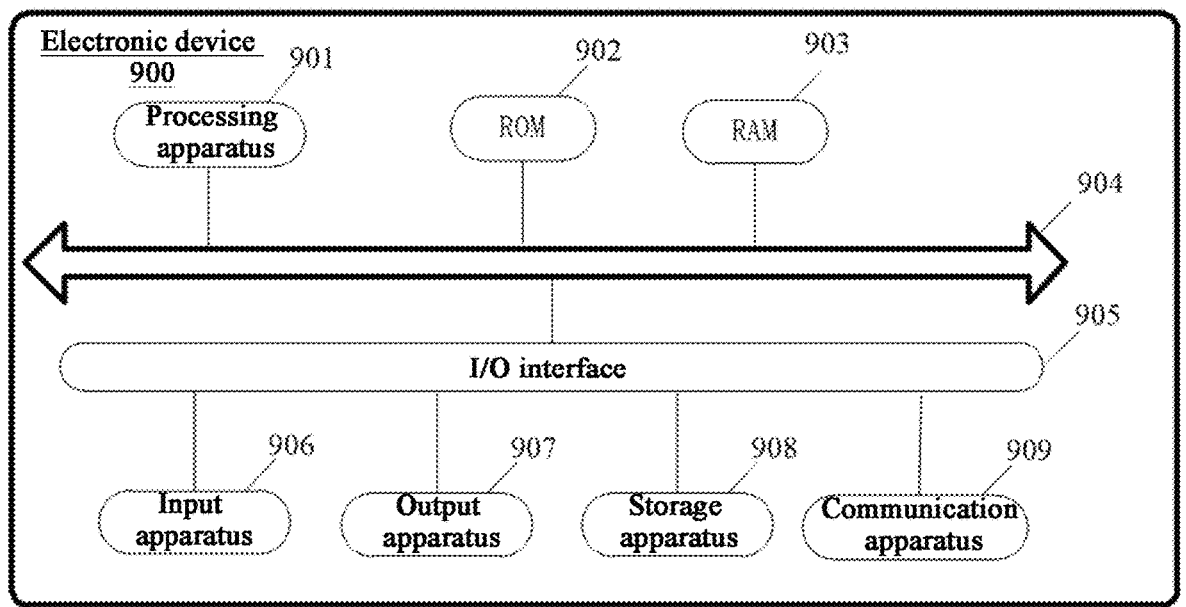
FIG. 14 is a schematic structural diagram of an electronic device according to the embodiments of the present disclosure.

FIG. 14 is a schematic structural diagram of an electronic device according to the embodiments of the present disclosure. Referring to FIG. 14, a schematic structural diagram of an electronic device 900 suitable for implementing the embodiments of the present disclosure is shown. The electronic device 900 can be a terminal device or a server. The terminal device can include but is not limited to mobile terminals such as a mobile phone, a laptop, a digital broadcast receiver, a Personal Digital Assistant (PDA), a Portable Android Device (PAD), a Portable Media Player (PMP), a vehicle-mounted terminal (such as a vehicle-mounted navigation terminal), and fixed terminals such as a digital TV and a desk computer. The electronic device shown in FIG. 14 is only an example and should not impose any limitations on the functionality and scope of use of the embodiments of the present disclosure.

As shown in FIG. 14, the electronic device 900 may include a processing apparatus (such as a central processing unit and graphics processor) 901 that can perform various appropriate actions and processing according to programs stored in a Read Only Memory (ROM) 902 or loaded from a storage apparatus 908 to a Random Access Memory (RAM) 903. Various programs and data required for operations of the electronic device 900 may also be stored in the RAM 903. The processing apparatus 901, the ROM 902, and the RAM 903 are connected to each other through a bus 904. An Input/Output (I/O) interface 905 is also connected to the bus 904.

Usually, following apparatuses can be connected to the I/O interface 905: an input apparatus 906 including a touch screen, a touchpad, a keyboard, a mouse, a camera, a microphone, an accelerometer, a gyroscope, and the like; an output apparatus 907 including a Liquid Crystal Display (LCD), a speaker, a vibrator, and the like; a storage apparatus 908 including a magnetic tape, a hard disk drive, and the like; and a communication apparatus 909. The communication apparatus 909 can allow the electronic device 900 to wirelessly or wiredly communicate with other devices to exchange data. Although FIG. 14 shows the electronic device 900 with multiple apparatuses, it should be understood that the electronic device 900 is not required to implement or have all the apparatuses shown, and can alternatively implement or have more or fewer apparatuses.

Particularly, according to the embodiments of the present disclosure, the process described in the reference flowchart above can be implemented as a computer software program. For example, the embodiments of the present disclosure include a computer program product, including a computer program carried on a computer-readable medium, and the computer program includes program codes used for performing the methods shown in the flowcharts. In such an embodiment, the computer program may be downloaded and installed from a network through the communication apparatus 909, or installed from the storage apparatus 908, or installed from the ROM 902. When the computer program is executed by the processing apparatus 901, the above-mentioned functions defined in the methods of the embodiments of the present disclosure are executed.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage media may include, but are not limited to: an electrical connection with one or more wires, a portable computer disk, a hard disk drive, a RAM, a ROM, an Erasable Programmable Read Only Memory (EPROM or flash memory), an optical fiber, Compact Disk Read Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but not limited to: a wire, an optical cable, a Radio Frequency (RF), and the like, or any suitable combination of the above.

The computer-readable medium may be included in the electronic device or exist alone and is not assembled into the electronic device.

The above computer-readable medium carries one or more programs. When executed by the electronic device, the one or more programs cause the electronic device to implement the methods shown in the above embodiments.

Computer program codes for performing the operations of the present disclosure may be written in one or more programming languages or a combination thereof. The above programming languages include an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case that a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units described in the embodiments of the present disclosure can be implemented through software or hardware. The name of the unit does not constitute a limitation on the unit itself. For example, the first obtaining unit can also be described as "a unit that obtains at least two Internet protocol addresses".

The functions described herein above may be performed, at least in part, by one or a plurality of hardware logic components. For example, non-restrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable medium may include an electrical connection based on one or more wires, a portable computer disk, a hard disk drive, a RAM, a ROM, an EPROM or flash memory, an optical fiber, a CD-ROM, an optical storage device, a magnetic storage device, or any suitable combinations of the above contents.

In a first aspect, according to one or more embodiments of the present disclosure, an information display method is provided, including:

displaying M first images in a first region, wherein each first image corresponds to N sub-images, the N sub-images are images formed by dividing the first image into N parts, M is an integer greater than or equal to 1, and N is an integer greater than 1;

in response to a first operation instruction, determining K sub-images from the M*N sub-images corresponding to the M first images, and displaying some or all of the K sub-images in a second region, wherein K is an integer greater than or equal to 1;

updating a display mode of the K sub-images in the M first images, and displaying a splicing number corresponding to each first image, wherein the splicing number is a number of first images formed by splicing the K sub-images; and if a splicing number corresponding to a first image is greater than 1, generating prompt information.

According to one or more embodiments of the present disclosure, the displaying some or all of the K sub-images in a second region includes:

displaying L sub-images among the K sub-images in the second region, wherein the L sub-images are different images; L is greater than or equal to 1; and L is less than or equal to K.

According to one or more embodiments of the present disclosure, the displaying L sub-images among the K sub-images in the second region includes:

displaying the L sub-images at P image display positions of the second region, wherein P is an integer greater than or equal to 1, wherein an image display position is used for displaying N sub-images; and the N sub-images, which are spliced into one of the first images, among the L sub-images are displayed in one image display position.

According to one or more embodiments of the present disclosure, if P is greater than or equal to a preset threshold, adjacent image display positions among the P image display positions have overlap regions.

According to one or more embodiments of the present disclosure, the updating a display mode of the K sub-images in the M first images includes:

highlighting a region where the K sub-images in the M first images are located; or, labeling a region where the K sub-images in the M first images are located.

According to one or more embodiments of the present disclosure, for any first image among the M first images, the displaying a splicing number corresponding to the first image includes:

when the splicing number corresponding to the first image is greater than or equal to 1, displaying the splicing number corresponding to the first image.

According to one or more embodiments of the present disclosure, the displaying a splicing number corresponding to the first image includes:

displaying the splicing number in a display region corresponding to the first image, wherein the display region is any one of the following regions:

an upper left corner of a region where the first image is located; or, an upper right corner of a region where the first image is located; or, a lower left corner of a region where the first image is located; or, a lower right corner of a region where the first image is located.

According to one or more embodiments of the present disclosure, before updating a display mode of the K sub-images in the M first images, the method further includes:

playing an image movement animation according to positions of the K sub-images and positions of the M first images in the first region, wherein the image movement animation includes: an animation showing that each sub-image displayed in the second region moves towards the same sub-image in the first region.

In a second aspect, according to one or more embodiments of the present disclosure, an image processing apparatus is provided, including a display module, a determining module, an update module, and a generation module, wherein the display module is configured to: display M first images in a first region and display a second image in a second region, wherein each first image corresponds to N sub-images, the N sub-images are images formed by dividing the first image into N parts, M is an integer greater than or equal to 1, and N is an integer greater than 1;

the determining module is configured to: in response to a first operation instruction, determine K sub-images from the M*N sub-images corresponding to the M first images, and display some or all of the K sub-images in a second region, wherein K is an integer greater than or equal to 1;

the update module is configured to: update a display mode of the K sub-images in the M first images, and display a splicing number corresponding to each first image, wherein the splicing number is a number of the K sub-images which are spliced into the first image; and the generation module is configured to: if a splicing number corresponding to a first image is greater than 1, generate prompt information.

According to one or more embodiments of the present disclosure, the determining module is further configured to:

display L sub-images among the K sub-images in the
second region, wherein the L sub-images are different
images; L is greater than or equal to 1; and L is less than
or equal to K.

According to one or more embodiments of the present
disclosure, the determining module is further configured to:
display the L sub-images at P image display positions of
the second region, wherein P is an integer greater than
or equal to 1,
wherein an image display position is used for displaying
N sub-images; and the N sub-images, which are spliced
into one of the first images, among the L sub-images are
displayed in one image display position.

According to one or more embodiments of the present
disclosure, if P is greater than or equal to a preset threshold,
adjacent image display positions among the P image display
positions have overlap regions.

According to one or more embodiments of the present
disclosure, the update module is further configured to:
highlight a region where the K sub-images in the M first
images are located; or,
label a region where the K sub-images in the M first
images are located.

According to one or more embodiments of the present
disclosure, the update module is further configured to:
when the splicing number corresponding to the first image
is greater than or equal to 1, display the splicing
number corresponding to the first image.

According to one or more embodiments of the present
disclosure, the update module is further configured to:
display the splicing number in a display region corre-
sponding to the first image, wherein the display region
is any one of the following regions:
an upper left corner of a region where the first image is
located; or,
an upper right corner of a region where the first image is
located; or,
a lower left corner of a region where the first image is
located; or,
a lower right corner of a region where the first image is
located.

According to one or more embodiments of the present
disclosure, the image processing apparatus further includes
a playing module. The playing module is configured to: play
an image movement animation according to positions of the
K sub-images and positions of the M first images in the first
region, wherein the image movement animation includes: an
animation showing that each sub-image displayed in the
second region moves towards the same sub-image in the first
region.

In a third aspect, according to one or more embodiments
of the present disclosure, an electronic device is provided,
including: at least one processor and a memory,
wherein the memory stores computer-executable instruc-
tions; and
the at least one processor executes the computer-execut-
able instructions stored in the memory to cause the at
least one processor to perform the image processing
method in the first aspect and in various possible
designs of the first aspect.

In a fourth aspect, according to one or more embodiments
of the present disclosure, a computer-readable storage
medium is provided, wherein the computer-readable storage
medium stores computer-executable instructions; and a pro-
cessor, when executing the computer-executable instruc-
tions, implements the image processing method in the first
aspect and in various possible designs of the first aspect.

In a fifth aspect, according to one or more embodiments
of the present disclosure, a computer program product is
provided, including a computer program, wherein the com-
puter program, when executed by a processor, implements
the image processing method in the first aspect and in
various possible designs of the first aspect.

In a sixth aspect, according to one or more embodiments
of the present disclosure, a computer program is provided,
including program instructions. The program instructions,
when executed by a computer, implement the image pro-
cessing method in the first aspect and in various possible
designs of the first aspect.

The above description is only for explaining the preferred
embodiments of the present disclosure and technical prin-
ciples used in the embodiments. Those skilled in the art
should understand that the scope of disclosure referred to in
the present disclosure is not limited to the technical solutions
formed by specific combinations of the aforementioned
technical features, but also covers other technical solutions
formed by any combinations of the aforementioned techni-
cal features or their equivalent features without departing
from the concept of the above disclosure, For example, a
technical solution formed by replacing the above features
with (but not limited to) technical features with similar
functions disclosed in the present disclosure.

In addition, although various operations are depicted in a
specific order, this should not be understood as requiring
these operations to be executed in the specific order shown
or in a sequential order. In certain environments, multitask-
ing and parallel processing may be advantageous. Similarly,
although several specific implementation details are
included in the above discussion, these should not be inter-
preted as limiting the scope of the present disclosure. Some
features described in the context of individual embodiments
can also be combined and implemented in a single embodi-
ment. On the contrary, various features that are described in
the context of the single embodiment may also be imple-
mented in a plurality of embodiments separately or in any
suitable sub-combinations.

Although the subject matter has been described in a
language specific to structural features and/or method logi-
cal actions, it should be understood that the subject matter
limited in the attached claims may not necessarily be limited
to the specific features or actions described above. On the
contrary, the specific features and actions described above
are only exemplary forms for implementing the claims.

We claim:
1. An image processing method, comprising:
displaying a plurality of first images in a first region and
displaying a plurality of second images in a second
region, wherein each of the plurality of first images is
divided into a plurality parts corresponding to a plu-
rality of sub-images;
in response to a first operation instruction, determining at
least one subset of sub-images, wherein the sub-images
are formed from dividing the plurality of first images;
switching to displaying the at least one subset of the
sub-images in the second region, wherein the at least
one subset of the sub-images includes all parts of at
least one of the plurality of first images;
updating a display mode of the plurality of first images in
the first region based on the at least one subset of the
sub-images displayed in the second region, wherein the
updating the display mode of the plurality of first
images comprises highlighting or labeling parts in the plurality of first images, the highlighted or labelled parts corresponding to the at least one subset of the sub-images; and displaying a splicing number, the splicing number being a number of the at least one of the plurality of first images all parts of which are included in the at least one subset of the sub-images.

2. The method according to claim 1, wherein the at least one subset of the sub-images are different from each other.

3. The method according to claim 2, further comprising:

displaying the at least one subset of the sub-images at image display positions of the second region.

4. The method according to claim 3, wherein when a number of the image display positions is greater than or equal to a preset threshold, adjacent image display positions among the image display positions have overlap regions.

5. The method according to claim 1, further comprising:

in response to determining that the splicing number is greater than or equal to 1, displaying the splicing number.

6. The method according to claim 1, wherein displaying a splicing number comprises:

displaying the splicing number in a display region corresponding to the at least one of the plurality of first images, wherein the display region is any one of the following regions:

an upper left corner of a region where the at least one of the plurality of first images is located; or, an upper right corner of a region where the at least one of the plurality of first images is located; or, a lower left corner of a region where the at least one of the plurality of first images is located; or, a lower right corner of a region where the at least one of the plurality of first images is located.

7. The method according to claim 1, further comprising:

playing an image movement animation according to positions of the at least one subset of the sub-images and positions of the plurality of first images in the first region, wherein the image movement animation comprises:

an animation showing that each sub-image displayed in the second region moves towards a corresponding part in the first region.

8. The method according to claim 1, further comprising:

in response to the splicing number being greater than 1, generating prompt information.

9. An electronic device, comprising: a processor and a memory, wherein the memory stores computer-executable instructions; and the processor executes the computer-executable instructions stored in the memory to cause the processor to:

display a plurality of first images in a first region and displaying a plurality of second images in a second region, wherein each of the plurality of first images is divided into a plurality parts corresponding to a plurality of sub-images;

in response to a first operation instruction, determine at least one subset of sub-images, wherein the sub-images are formed from dividing the plurality of first images;

switch to displaying the at least one subset of the sub-images in the second region, wherein the at least one subset of the sub-images includes all parts of at least one of the plurality of first images;

update a display mode of the plurality of first images in the first region based on the at least one subset of the sub-images displayed in the second region, wherein the updating the display mode of the plurality of first images comprises highlighting or labeling parts in the plurality of first images, the highlighted or labelled parts corresponding to the at least one subset of the sub-images; and display a splicing number, the splicing number being a number of the at least one of the plurality of first images all parts of which are included in the at least one subset of the sub-images.

10. The electronic device according to claim 9, wherein the at least one subset of the sub-images are different from each other.

11. The electronic device according to claim 10, wherein the computer-executable instructions to further cause the processor to:

display the at least one subset of the sub-images at image display positions of the second region.

12. The electronic device according to claim 11, wherein when a number of the image display positions is greater than or equal to a preset threshold, adjacent image display positions among the image display positions have overlap regions.

13. The electronic device according to claim 9, wherein the computer-executable instructions to further cause the processor to:

in response to determining that the splicing number is greater than or equal to 1, display the splicing number.

14. The electronic device according to claim 13, wherein the computer-executable instructions to further cause the processor to:

display the splicing number in a display region corresponding to the at least one of the plurality of first images, wherein the display region is any one of the following regions:

an upper left corner of a region where the at least one of the plurality of first images is located; or, an upper right corner of a region where the at least one of the plurality of first images is located; or, a lower left corner of a region where the at least one of the plurality of first images is located; or, a lower right corner of a region where the at least one of the plurality of first images is located.

15. The electronic device according to claim 9, wherein the computer-executable instructions further comprise computer-executable instructions to cause the processor to:

play an image movement animation according to positions of the at least one subset of the sub-images and positions of the plurality of first images in the first region, wherein the image movement animation comprises:

an animation showing that each sub-image displayed in the second region moves towards a corresponding part in the first region.

16. The electronic device according to claim 9, wherein the computer-executable instructions further comprise computer-executable instructions to cause the processor to:

in response to the splicing number being greater than 1, generate prompt information.

17. A non-transitory computer-readable storage medium, comprising a computer program comprising computer-executable instructions, wherein the computer-executable instructions are executed by a processor to cause the processor to perform operations comprising:

displaying a plurality of first images in a first region and displaying a plurality of second images in a second region, wherein each of the plurality of first images is divided into a plurality parts corresponding to a plurality of sub-images;

in response to a first operation instruction, determining at least one subset of sub-images, wherein the sub-images are formed from dividing the plurality of first images;

switching to displaying the at least one subset of the sub-images in the second region, wherein the at least one subset of the sub-images includes all parts of at least one of the plurality of first images;

updating a display mode of the plurality of first images in the first region based on the at least one subset of the sub-images displayed in the second region, wherein the updating the display mode of the plurality of first images comprises highlighting or labeling parts in the plurality of first images, the highlighted or labelled parts corresponding to the at least one subset of the sub-images; and displaying a splicing number, the splicing number being a number of the at least one of the plurality of first images all parts of which are included in the at least one subset of the sub-images.

18. The computer program product according to claim 17, wherein the at least one subset of the sub-images are different from each other.

* * * * *